US005101443A

United States Patent [19]

Behrmann-Poitiers

[11] Patent Number: 5,101,443

[45] Date of Patent: Mar. 31, 1992

[54] METHOD AND APPARATUS FOR REDUCING A PATTERN OF BINARY PIXELS TO ONE OF LOWER RESOLUTION

[75] Inventor: Jens Behrmann-Poitiers, Hamburg, Fed. Rep. of Germany

[73] Assignee: U.S. Philips Corporation, New York, N.Y.

[21] Appl. No.: 478,792

[22] Filed: Feb. 12, 1990

[30] Foreign Application Priority Data

Feb. 17, 1989 [DE] Fed. Rep. of Germany ....... 3904809

[51] Int. Cl.[5] .............................................. G06K 9/00

[52] U.S. Cl. ...................................... 382/47; 358/433; 358/451; 382/56

[58] Field of Search ............................ 382/47, 50, 56; 358/433, 451, 456; 340/731

[56] References Cited

U.S. PATENT DOCUMENTS 4,555,191 11/1985 Gojo .................................... 382/56
4,783,838 11/1988 Matsunawa ......................... 358/451
4,827,353 5/1989 Ehlers et al. ........................ 358/451
4,930,022 5/1990 Kubota ............................... 358/451

*Primary Examiner*—Leo H. Boudreau
*Attorney, Agent, or Firm*—Jack D. Slobod

[57] ABSTRACT

Method and apparatus for converting a pattern, consisting of a matrix of binary pixels and representing a pseudo half-tone picture in particular, into a pattern having a lower resolution, in which the picture to be reduced is subdivided into fields and the pixels having a predetermined binary value in each field are counted, as a result of which a reduced quasi-real grey-tone picture develops. This grey-tone picture is compared to thresholds of a repeatedly used threshold matrix and the comparison results then provide the binary pixels of the reduced pseudo half-tone picture. A further reduction is obtained in that at a regular distances fields or grey-tone pixels respectively, are omitted from the fields of the matrix of the picture to be reduced or from the pixels of the grey-tone picture produced meanwhile.

8 Claims, 3 Drawing Sheets

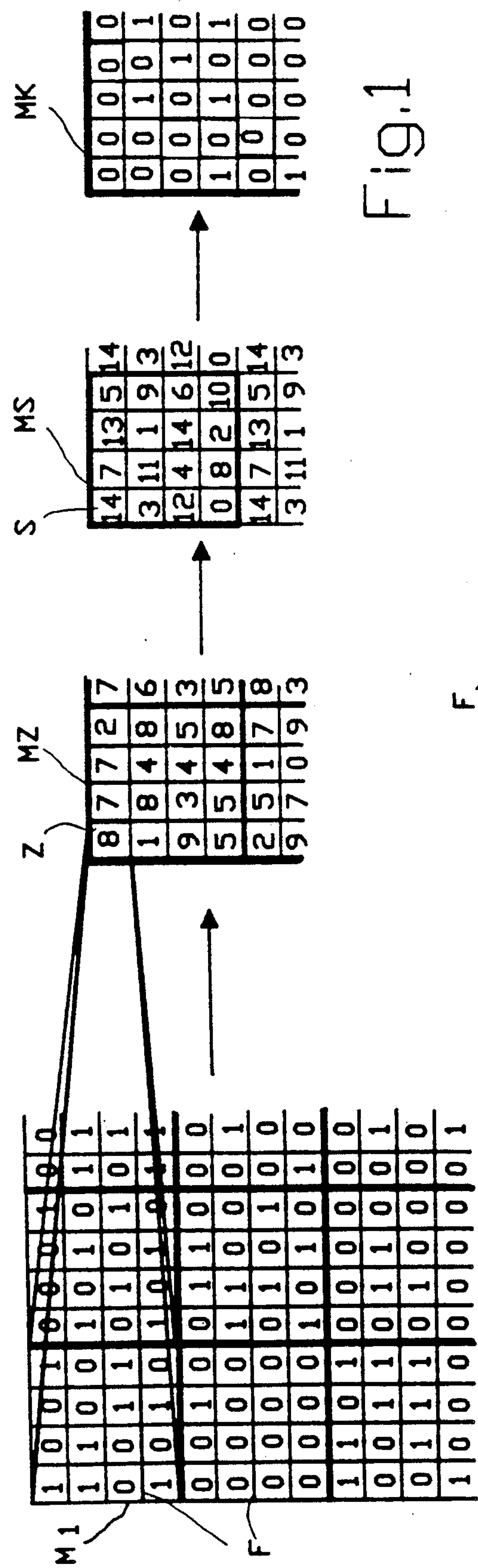
Fig.1
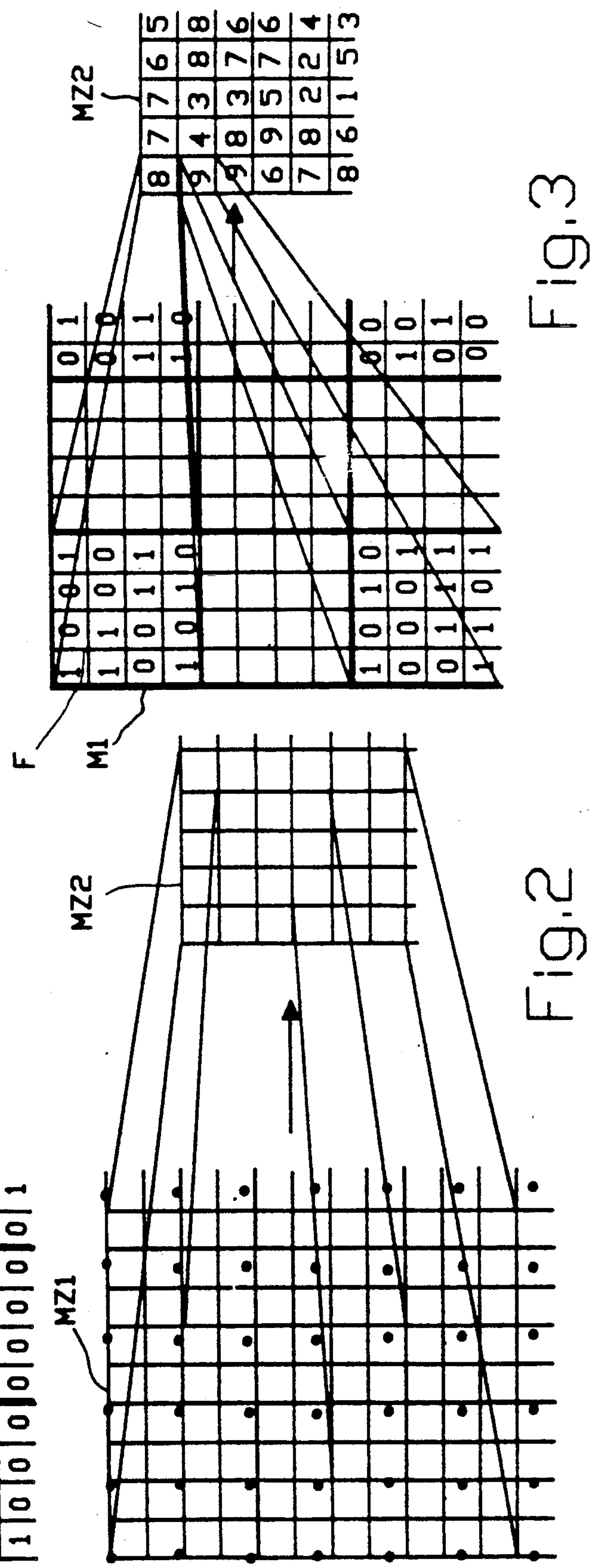
Fig.3
Fig.2

METHOD AND APPARATUS FOR REDUCING A PATTERN OF BINARY PIXELS TO ONE OF LOWER RESOLUTION

BACKGROUND OF THE INVENTION

1. Field of the Invention

The invention relates to a method of converting a first pattern consisting of a first matrix of binary pixels into a second, pattern having a lower resolution than the first pattern, in the form of a second matrix having fewer binary pixels than the first matrix, wherein the first matrix is subdivided into adjacent fields and a pixel number representing the number of pixels of one binary value in each field is determined, whereupon each pixel number is compared to a threshold value, as well as an arrangement for implementing the method.

2. Description of the Prior Art

Such a method is known from U.S. Pat. No. 3,676,982, the first pattern being formed by a pseudo-halftone picture, and the second pattern being a reduced version thereof. In this Patent the fields into which the first matrix has been subdivided are quadratic and the pixel number representing the number of pixels having the binary value "1" in each field is determined, and this counted value is compared to a fixed threshold value which is equal to half the pixels of each field. The results of this comparison provide the reduced picture in which each pixel corresponds with a field of the first matrix. However, it may easily happen that the reduced picture is totally useless as a result of the comparison to a fixed threshold value. The fact is, if a number of adjacent fields are to reproduce a pseudo grey-tone which is slightly darker than the average value, more than half the pixels in each field have the binary value "1", and in the reduced picture a black dot will appear for each of them. A plurality of such adjacent fields having a nearly mean grey tone will thus appear in the reduced picture as a completely black zone. The same holds if a plurality of adjacent fields represents a grey tone which slightly exceeds the mean value and turns out white in the reduced picture.

SUMMARY OF THE INVENTION

Therefore, it is an object of the invention to provide a method of the type mentioned in the opening paragraph, according to which reduced patterns can be produced in which the average distribution of pixel values of the original pattern is reproduced as truly as possible.

According to the invention this object is achieved in that each time for a first number of adjacent fields the threshold values are mutually different.

By using mutually different threshold values it is accomplished that a first pattern with about similar distributions of the binary values of the pattern elements (pixels), gives rise to corresponding distributions of the binary values in the second pattern, and that practically no distortion occurs. In case the first pattern is a pseudo-halftone picture, the numbers produced on the basis of the first pattern represent a reduced grey-tone picture. The grey-tone of each pixel in this grey-tone picture is represented by a multi-bit number in conformity with the numbers produced and this reduced grey-tone picture is then converted into a pseudo half-tone picture by customary methods, for example, by the Ordered Dither Method. Consequently, the grey-tone values of the original picture are largely maintained.

In case the first pattern represents a pseudo half-tone picture that has been produced accordingly, i.e. by means of a matrix of threshold values, it is suitable for the size of the fields to be selected equally large as the size of this threshold matrix. The resultant reduced picture, however, may still be larger than desired. In that case it is advantageous that, according to an embodiment of the invention, from the first number of fields a second number, smaller than the first number, of intermediate values are formed and in that the second pattern is formed from the intermediate values. This might be effected, for example, by taking averages, but this requires substantial computation circuitry and cost. According to a further embodiment of the invention a simpler solution likewise providing largely true reduced patterns, is characterized in that each intermediate value is selected from said first numbers according to a predetermined order of the fields. The order of selection, in the simplest cases, for example, in the direction of rows and columns of each $n^{th}$ intermediate value can be obtained by means of a very simple address control.

An arrangement for implementing the method according to the invention comprising a counter counting the number of pixels of one value for each field of the first matrix and forming thus a pixel number or counting result, and including a comparator comparing each counting result to a threshold value in accordance with U.S. Pat. No. 3,676,982, is characterized in that there are provided a threshold value memory for storing the different threshold values and an addressing arrangement, which reads for each pixel number of each first number of adjacent fields a different threshold value from the threshold value memory and applies this to the comparator. By using a threshold value memory with associated addressing it will be very simple to produce a largely true copy of a reduced pattern from the counter values produced in a known manner.

A particularly simple design of the control for generating the reduced pseudo half-tone picture in an embodiment of the arrangement according to the invention is characterized in that an intermediate memory is provided recording all pixel numbers and in that the addressing arrangement furthermore addresses in the intermediate memory the pixel numbers of each first number of adjacent fields and applies them to the comparator. The addressing arrangement can then consecutively finish the individual pixel numbers in a natural sequence and simultaneously finish the generation of the reduced picture or address a memory for this purpose. If a further reduction is concerned, it is suitable for the addressing arrangement to address only part of the pixel numbers and apply them to the comparator. If, for example, only the pixel numbers of each second row and each second column are to be used, this can easily be effected by skipping some outputs of a binary counter as an addressing arrangement.

A further possibility requiring very little circuitry and cost especially with stronger reductions by omitting part of the pixel numbers is characterized in that the addressing arrangement furthermore controls the supply of pixel values of the first matrix to the counter and in that the output of the counter is directly coupled to the comparator. When doing so, the addressing sequence is slightly more complex, it is true, but for a predetermined reduction scale it needs to be determined only once for all pictures and the intermediate memory is omitted.

BRIEF DESCRIPTION OF THE DRAWING

Exemplary embodiments of the invention will be further explained hereinbelow with reference to the drawing Figures in which:

FIG. 1 shows the processes with the method according to the invention with reference to picture-, pixel number- and threshold matrices, FIG. 2 shows the principle of further reduction by the selection of individual pixel numbers, FIG. 3 shows a possibility for direct conversion of the original pseudo half-tone picture into a reduced grey-tone matrix.

DETAILED DESCRIPTION OF THE PREFERRED EMBODIMENTS

Figure 4:
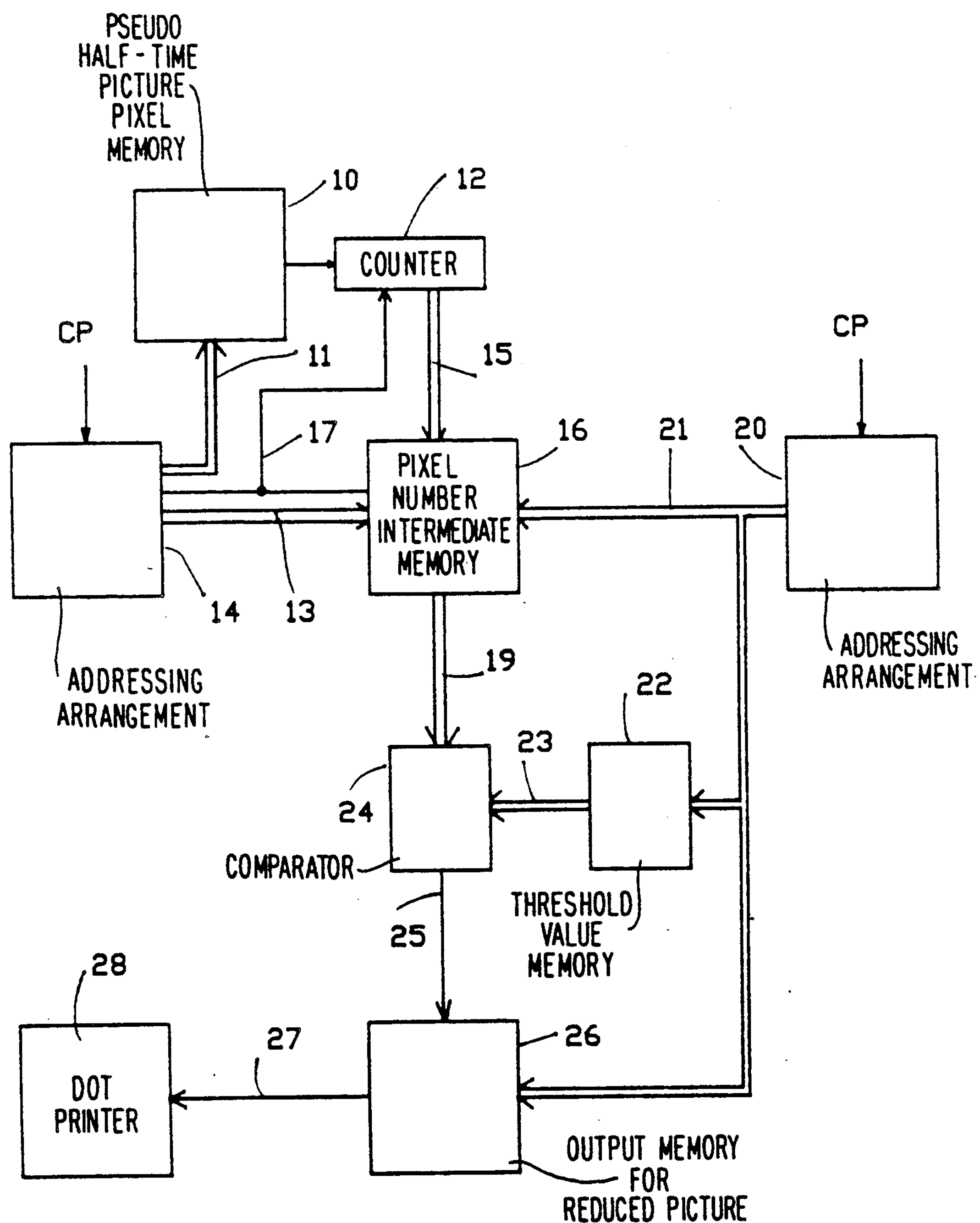
FIG. 4 shows a first embodiment of an arrangement according to the invention comprising an intermediate memory.

In FIG. 1 the matrix M1 of the original pseudo half-tone picture, from which a reduced reproduction is to be generated in a most true-to-life manner, is subdivided into a number of adjacent quadratic fields F, defined by bold lines. Each field F comprises a 4×4 array of binary pixels which have the value "0" or "1". In this example the pixels having the value "1" are counted in each field and these pixel numbers Z for adjacent fields are arranged in a matrix MZ.

Each time pixel numbers Z, in this example also a sub-matrix of 4×4 pixel numbers, are compared to different threshold values S, here arranged in a threshold value matrix MS which has the same dimensions as the sub-matrix of the pixel numbers. If the relevant pixel number Z is smaller than the associated threshold value or equals the same, a pixel having the value "0" will be put at this location in the matrix MK of the desired reduced picture, and if the relevant pixel number Z exceeds the associated threshold value S, a pixel having the value "1" will be inserted. The threshold value matrix MS is again applied to the pixel numbers Z of adjacent sub-matrices in the matrix MZ, which corresponds with a column-by-column iteration of the threshold value matrix MS, as is shown in FIG. 1. Actually, the threshold value matrix MS needs to be stored only once. In this manner the complete matrix MK of the binary pixels of the desired reduced picture will finally develop, which will then preferably be printed by means of a dot printer arrangement.

In some cases the reduced picture in accordance with matrix MK is still too large, because one pixel of the matrix MK is produced from the pixels of each field F, so that the size of the field F determines the scale of reduction. For a stronger reduction the size of the fields F, that is to say, the number of pixels in this field, could be increased. However, it has been established that consequent to this the structure of the original picture is blurred too much, so that the reduced picture does not correspond so well with the original picture. For a rather strong picture reduction it is therefore more favourable to start in principle from the matrix MZ of the pixel numbers Z and produce a smaller matrix of intermediate values therefrom. This is shown in FIG. 2. In this Figure a matrix MZ1 of pixel numbers is represented, which corresponds with the matrix MZ in FIG. 1. This matrix is to be mapped into a second matrix MZ2 of reduced resolution containing intermediate values obtained by spatial sampling matrix MZ1 in accordance with dots which shown over the matrix MZ1 denoting crossings for example denoting the crosses of the rows and columns of matrix MZ2. As can be recognised, this second matrix does not have the full double size of the elements which matrix MZ1 has. In the left hand top corner the two matrices match. Each matrix element of the coarser matrix is now obtained in that for example the value of the nearest matrix element of the first matrix MZ1 on the basis of the Euclidian distance is used as measured in the index space of the matrix. If such an element of the first matrix MZ1 cannot be determined unambiguously, any, fixed predetermined arrangement of any two or four adjacent elements will determine the element to be selected. Thus, in this manner the matrix MZ1 of pixel numbers is shown determining the matrix MZ2 of intermediate values, as represented in FIG. 2.

However, it is alternatively possible to omit the intermediate step of forming the matrix MZ1 and determine directly from the matrix M1 of the original picture the matrix MZ2 of the intermediate values. For this purpose, only the fields or pixels in these fields, are selected which correspond with the matrix element to be selected from the matrix MZ1 of the pixel numbers shown in FIG. 2. This is represented in FIG. 3, where in the direction of rows and columns only each second field is used for producing the matrix MZ2. This requires less computation circuitry, but slightly enhanced addressing circuitry which, however, especially with constant reduction factors, is practically of no importance.

An arrangement for implementing the individual process steps as shown in FIG. 1 is represented in FIG. 4 as a block diagram. It is assumed that digital data signals representing the values of the binary pixels of the pseudo half-tone picture to be reduced are stored in memory 10. From an addressing arrangement 14, controlled by a clock signal CP, over the multi-wire bus 11, the addresses of the pixels of a field are produced consecutively and the pixel values are applied to a counter 12. Each pixel having the value "1" increments the counter 12 by one unit. The count is applied to the data input of an intermediate memory 16 over the connecting bus 15 also comprising various parallel lines.

After all pixels of a field have been addressed in memory 10, the addressing arrangement 14 produces on line 17 a signal causing the writing of the count applied over the bus 15 into the intermediate memory 16 at an address which is applied to this memory over the bus 13 by the addressing arrangement 14. Immediately after this, the counter 12 is reset to an initial position, preferably zero, as a result of the signal on line 17, and the addressing arrangement 14 generates the addresses for the pixels of the next field in memory 10. In this manner all pixel numbers are written consecutively into the intermediate memory 16. The contents thereof practically represent a reduced grey-tone intermediate picture of the pseudo half-tone picture contained in memory 10.

Subsequently, the intermediate memory 16 is addressed over the multi-wire bus 21 by a further addressing arrangement 20, also controlled by a clock signal CP, and the pixel numbers contained in the memory are read and thereafter supplied over the bus 19. Basically, the addressing arrangements 14 and 20 could be combined to a single addressing arrangement, but for clarity two separate addressing arrangements have been shown in this Figure.

Furthermore, over the bus 21 or at least several lines thereof, a threshold value memory 22 is addressed containing different threshold values for different addresses. Over the bus 23 the addressed threshold value is applied to the one input of a comparator 24, which at the other input receives the pixel number applied over the bus 19 which has been read from the intermediate memory 16. Depending on whether the value on the bus 19 or bus 23 is larger, the comparator 24 produces at the output 25 a binary signal which, in this example, is written into an output memory 26, which contains the reduced pseudo half-tone picture after all pixel numbers of the intermediate memory 16 have been processed. This picture may then be applied over the line 27 to a printer 28 of the dot printing type (e.g. matrix printer).

The threshold value memory 22 contains only a small number of threshold values, for example 4×4 threshold values, and consequently contains considerably fewer values than the intermediate memory 16 does. The contents of the threshold value memory 22 are therefore read several times, whereas intermediate memory 16 is read only once, which can be achieved in a simple manner because only the address lines having specific values are connected to the address input of the threshold value memory 22.

Figure 5:
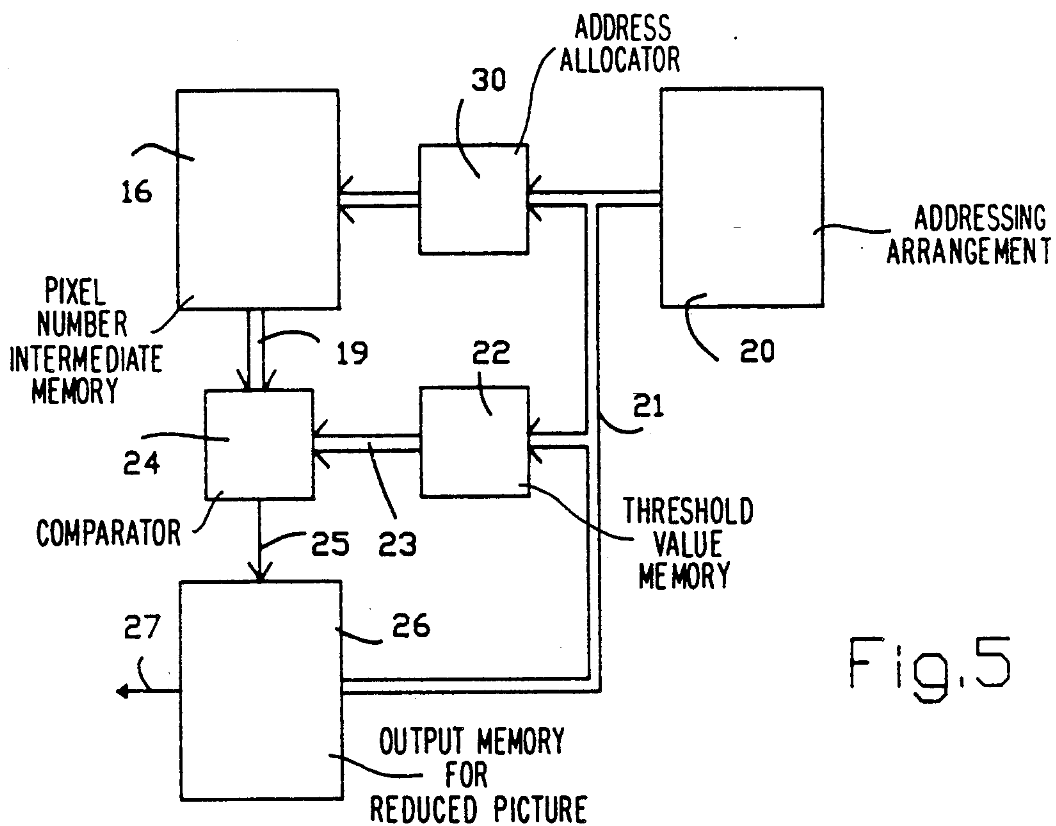
FIG. 5 shows a modified detail of this arrangement for skipping various pixel numbers.

As already observed with respect to FIG. 2, a desired multiple further reduction of the finally produced picture is achieved because only part of the pixel numbers are processed. The selection of these pixel numbers from the intermediate memory 16 is achieved by means of an extension to the arrangement represented in FIG. 4 which is represented in FIG. 5. In this arrangement the intermediate memory 16 is not directly addressed by the addressing arrangement 20 but by means of an address allocator 30 which creates the address of the pixel number to be selected belonging to each address generated by the addressing arrangement 20. For particularly simple further reduction scales, for example, a reduction to ½, where only the pixel numbers of each second column and row of the matrix is read out, the address allocator 30 maintains the corresponding-value address line or lines respectively, at a fixed potential. For different reduction scales the address allocator 30 may be formed, for example, by a read-only memory having corresponding contents. The addressing of the intermediate memory 22 and the output memory 26 for the reduced pseudo half-tone picture is performed in a manner described with reference to the arrangement shown in FIG. 4. The latter picture is again applied to the output arrangement (not shown) over the line 27.

Figure 6:
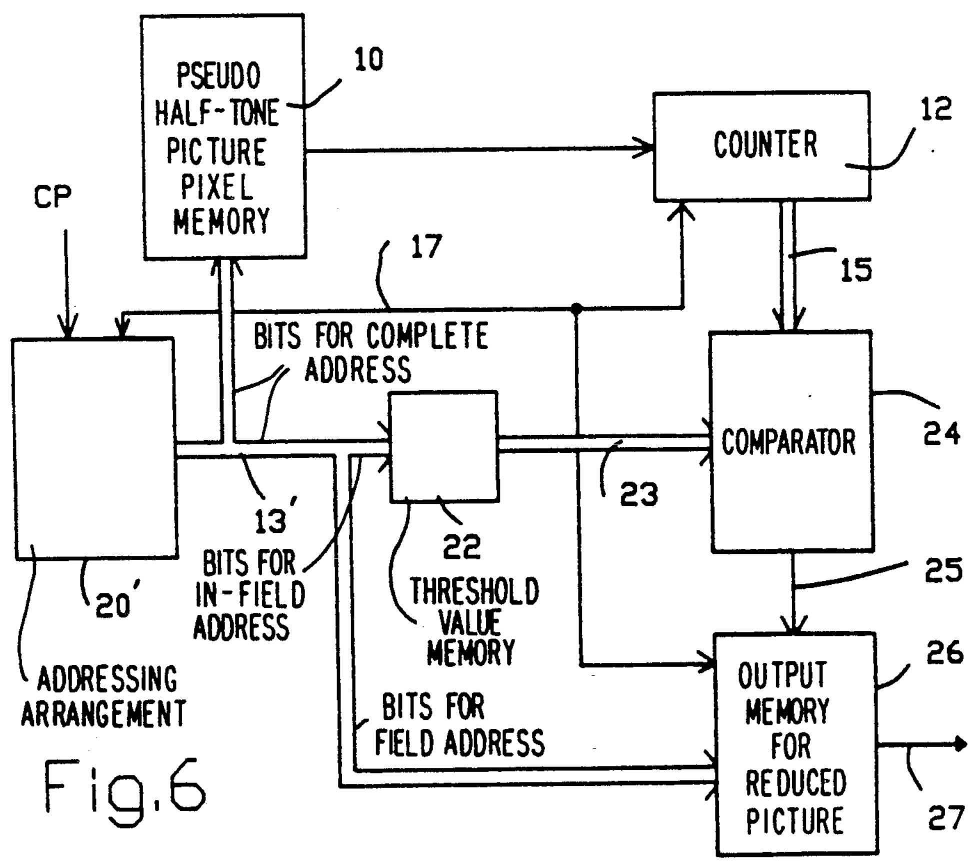
FIG. 6 shows a block diagram of an arrangement according to the invention without a buffer memory.

An arrangement for producing a reduced pseudo half-tone picture in which intermediate memories are omitted, is shown in FIG. 6 by way of a block diagram. In this diagram elements corresponding with those of the arrangement as shown in FIG. 4 have the same references. The pixels of the pseudo half-tone picture to be reduced are again stored in memory 10 which is here addressed from an addressing arrangement 20' over the multi-wire bus 13'. If the matrix of these pixels is subdivided into quadratic fields having a number of even square roots of two pixels, the addressing can be performed in a manner such that in the addresses applied over the bus 13' several bits address only the pixels inside each field and the remaining bits address the fields consecutively. The latter bits on the bus 13' are then used to address the output memory 26 and part of these bits are used to address the threshold value memory 22.

After generating all the addresses of the pixels of a field the addressing arrangement 20', again controlled via a clock signal CP, supplies a signal over the line 17, which signal causes the binary value produced at this instant by the comparator 24 on the output line 25 to be written into the output memory 26 at the addressed location. The comparator 24 compares the count originating from the counter 12 and conveyed over the bus 15 to the threshold value read from the threshold value memory 22. By means of the signal over the line 17 also the counter 12 is reset to its initial position after the comparison result has been written into the output memory 26.

After the complete addressing and processing of all the pixels in memory 10 the output memory 26 again contains all the pixels of the reduced pseudo half-tone picture which can be supplied over the line 27 to a generator means (not shown).

If a further reduction is required, because in the manner described hereinbefore not all fields of the pixel matrix in memory 10 are used, this reduction may be effected by omitting fields in, for example, each second row and column of the matrix in memory 10 so that not all the address inputs of the memory 10 are activated over the bus 13', but associated address inputs are maintained at a fixed potential as this has already been explained with respect to the intermediate memory 16 in the arrangement shown in FIG. 5. In a different sequence of fields to be omitted, an allocator (not shown) equal to the allocator 30 in the arrangement as shown in FIG. 5 can be inserted in the bus 13' before the address inputs of memory 10.

It will be evident that in the arrangements as shown in FIGS. 4 to 6 the output memory 26 may be omitted if the binary values produced at the output 25 of the comparator 24 can be directly used in the created sequence to control a picture generator means.

I claim:

1. Method of converting first digital signals representing a first pattern in the form of a first matrix of binary pixels into second digital signals representing a second pattern in the form of a second matrix of binary pixels having fewer binary pixels than the first matrix comprising subdividing the first matrix into two-dimensional fields, each field being associated with at most one binary pixel in the second matrix, determining a pixel number matrix of pixel numbers for respective fields of said first matrix associated with the binary pixels of the second matrix by counting binary pixels of one binary value within respective fields, subdividing said pixel number matrix into two-dimensional pixel number submatricies, and comparing the pixel numbers at positions within said sub-matrices to respective associated threshold values at corresponding positions in a matrix of different threshold values of the same dimensions as said sub-matrices.

2. Method as claimed in claim 1, wherein said pixel number matrix determined is a first pixel number matrix, and further comprising forming a second pixel number matrix dimensionally smaller than said first pixel number matrix by selecting first pixel numbers associated with non-adjacent fields of said first pixel number matrix, said comparing being of respective second pixel numbers to said respective associated threshold values.

3. Apparatus for converting first digital signals representing a first pattern in the form of a first matrix of binary pixels into second digital signals representing a second pattern in the form of a second matrix having fewer binary pixels than the first matrix, said first matrix being subdivided into two-dimensional fields such that each field is associated with at most one binary pixel in said second matrix, said apparatus comprising a counter for counting binary pixels of one binary value within respective fields of the first matrix associated with binary pixels of the second matrix and forming thus a pixel number matrix containing pixel numbers for respective fields, said pixel number matrix being divided into two-dimensional sub-matrices of equal dimensions, a comparator for comparing a pixel number for a field to a threshold value for that field, a threshold value memory for storing a threshold value matrix of the same dimensions as said sub-matrices and containing a plurality of different threshold values associated with the positions of fields within said sub-matrices, and an addressing means for reading for a respective field, based on the position of the field within a sub-matrix, a threshold value from the threshold value memory at a corresponding position in the threshold value matrix and applying the threshold value read to the comparator.

4. Apparatus as claimed in claim 3, further comprising an intermediate memory for storing said pixel numbers and wherein the addressing means is also for reading for a field, the associated pixel number from the intermediate memory and applying the pixel number read to the comparator.

5. Apparatus as claimed in claim 3, wherein said addressing means is configured to read threshold values for only fields which are not adjacent to each other.

6. Apparatus as claimed in claim 3, wherein the addressing means is also for controlling application of binary pixels to the counter and wherein the output of the counter is coupled directly to the comparator.

7. Apparatus as claimed in claim 4, wherein said addressing means is configured to read threshold values for only fields which are not adjacent to each other.

8. Apparatus as claimed in claim 6, wherein the addressing means is also for controlling application of binary pixels to the counter and wherein the output of the counter is coupled directly to the comparator.

* * * * *